Feb. 26, 1952   R. B. WATT   2,587,256
INTERNALLY EXPANDING BRAKE
Original Filed July 7, 1941   2 SHEETS—SHEET 1

Inventor
Raymond B. Watt,
By Christian R. Nielsen
Attorney

Feb. 26, 1952 R. B. WATT 2,587,256
INTERNALLY EXPANDING BRAKE
Original Filed July 7, 1941 2 SHEETS—SHEET 2
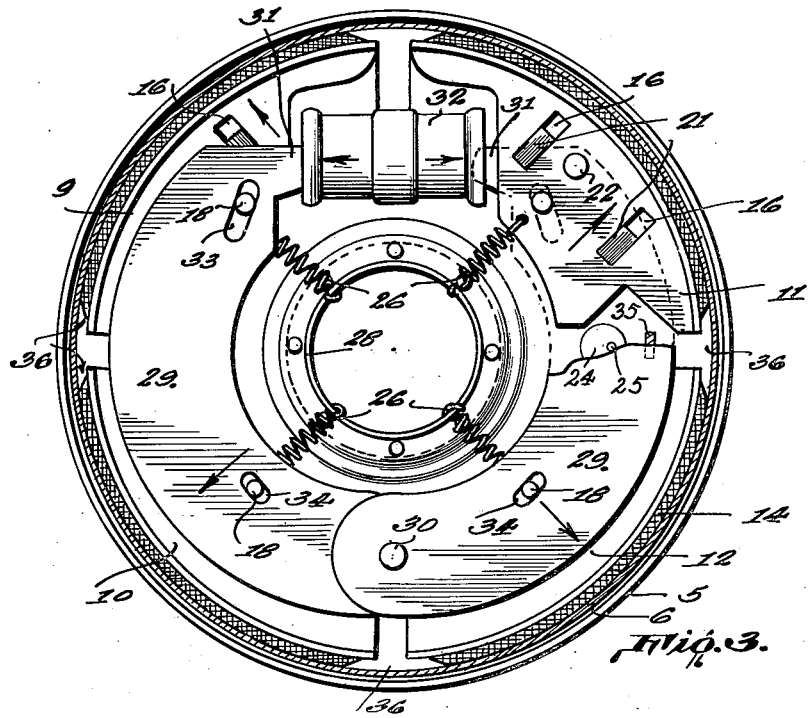
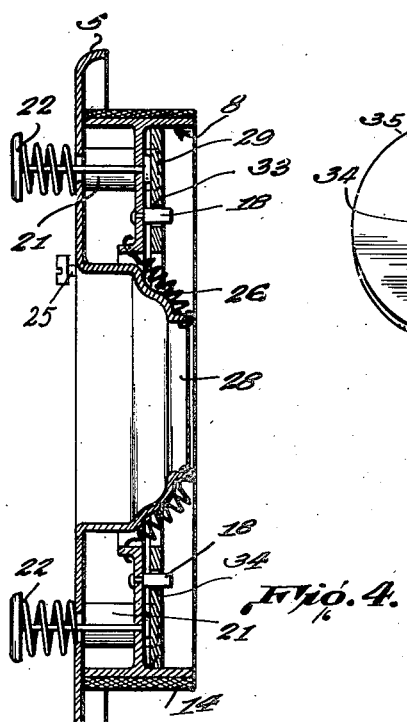
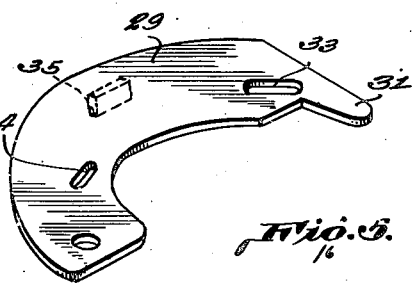
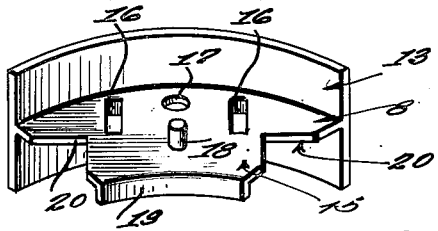
Inventor
Raymond B. Watt
By Christian R. Nielsen
Attorney

Patented Feb. 26, 1952

2,587,256

UNITED STATES PATENT OFFICE

2,587,256

INTERNALLY EXPANDING BRAKE

Raymond B. Watt, Washington, D. C.

Substituted for application Serial No. 401,347, July 7, 1941. This application September 27, 1946, Serial No. 699,612

1 Claim. (Cl. 188—78)

This application is a substitute for my abandoned application, Serial No. 401,347 filed July 7, 1941.

This invention relates to brakes and in particular to internal expanding brakes, and it consists in the constructions, and arrangements herein described and claimed.

In brakes of this kind, as at present made, the brake shoes are usually formed as levers, each pivoted at one end to the stationary plate. Their opposite ends are moved outwardly by cam or hydraulic action. In this arrangement, owing to the converging relationship between the shoes and the adjacent part of the brake drum when the brake is off, the pressure exerted by the brake lining on the brake drum is not uniform over the entire length of the brake lining. Further, owing to the position of the pivot about which the levers move, such pressure does not act radially in relation to the interior surface of the brake drum periphery. Thus, with the brakes generally used, it is impossible to obtain 100% braking of the power of the bands.

The object of the present invention is to provide an improved brake construction wherein four brake shoes are simultaneously expanded to cause the brake lining to equally engage the brake drum at all points. This affords approximately 360° of braking surface of the brake lining.

A further object of the invention is to provide a brake drum in which two pairs of shoes are arranged and mounted upon expander plates in a manner that permits the shoes to move radially and parallel with respect to the contact face.

A further object of the invention is to provide means for limiting the outward movement of the brake shoes so as to prevent the lining from wearing down to the shoe and thus cause scorching of the brake drum.

A further object of the invention is to provide means for balancing the braking movement imparted to the individual shoes.

A still further object of the invention is to provide a brake of simple and sturdy construction and suitable for use with all types of motor vehicles.

With the foregoing and other objects in view I have invented the brake that is the subject matter of this application and which is further described in the following detailed specification and illustrated in the accompanying drawings forming part of this application, and in which:

Figure 3 is a view similar to Figure 2 but with the brake shoes in partially expanded, braking position.

Figure 4 is a cross sectional view taken on line 4—4 of Figure 2.

Figure 5 is a perspective view of one of the expander members.

Figure 6 is a perspective view of one of the brake shoe segments.

Figure 1:
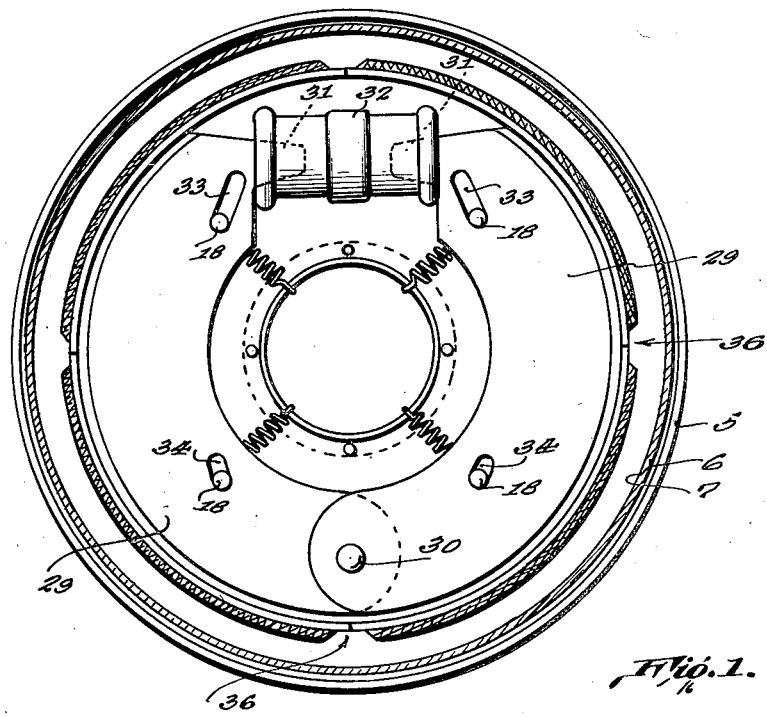
Figure 1 is a plan view of the brake mechanism assembled.

In the drawings, in which like numerals of reference denote similar parts, the numeral 5 generally designates the brake housing or backing plate conventionally incorporated in the road wheel of a motor vehicle. Associated with the backing plate is a rotatable drum 6 which is secured to the wheel, not shown, and provides an internal annular friction surface 7 for engagement with the brake shoes, which are of expanding type.

In carrying out the invention, I preferably supply a complement of shoes 8 composing a circle within the brake drum. The shoes 8 comprise two opposing sets, one of which comprises the shoes 9 and 10 and the other of the shoes 11 and 12. As will be evident from the drawings, each shoe is in the form of an arc of a circle, with the outer face 13 having brake lining 14 secured thereto in a suitable manner. The lining conforms to the curvature of the drum and its surface is adapted to engage the friction surface 7 of the drum 6 for braking the motion of the drum. Each shoe is reinforced by a suitable web 15 which produces a brake shoe that is T-shaped in cross section. Each brake shoe is provided with two slots 16, an opening 17 between the slots 16 and an upstanding boss 18, the purpose of which will be later described. The web 15 has its inner edge 19 flanged downwardly to strengthen the shoe and add to its rigidity. Also, the web of each brake shoe has a V-shaped portion 20 cut out at each end thereof.

Figure 2:
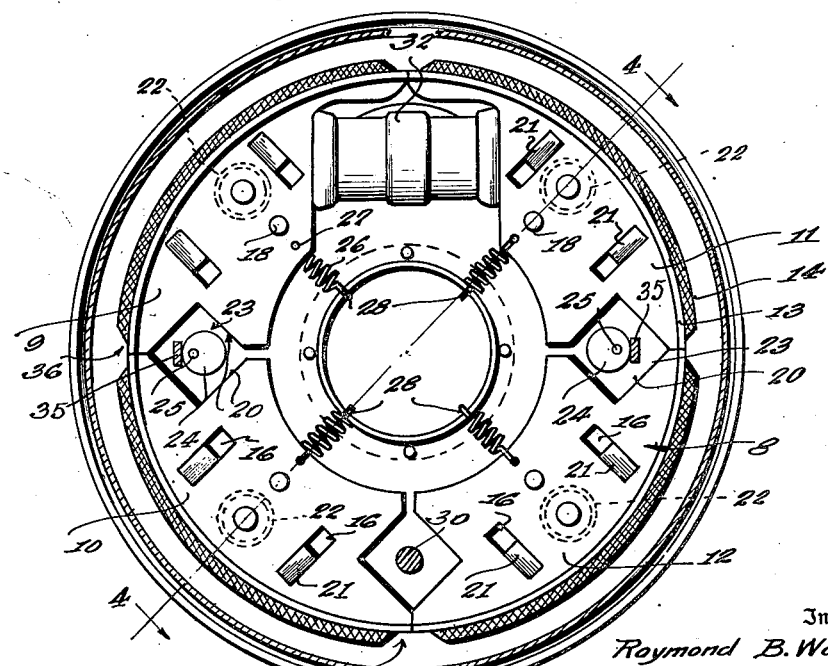
Figure 2 is a plan view of the brake mechanism with the shoe expanding members removed and with the brake shoes in contracted or neutral position.

Integral with and extending upwardly from the backing plate are the rectangular guide lugs and stops 21, two being provided for each brake shoe. These lugs are adapted to fit in the slots 16 of the brake shoe, as shown in Figure 2, and are of a size to permit reciprocating movement of the brake shoes. The brake shoes are radially movable and retained in place by means of the spring tensioned fasteners 22, Figure 4, which extend through the backing plate and hold the shoes thereto. The brake shoes are guided by means of the slots 16 and lugs 21. When assembled, as shown in Figure 2, the cut-out portions 20 in the webs of the brake shoes form square apertures in the centers of which are the shoe-adjusting members 23 consisting of the cam 24 mounted upon adjustable shafts 25. Turning of the shaft will bring the cam into engagement with the edges of the webs so that the brakes may be properly adjusted by spreading or contracting the brake shoes.

Tension springs 26 are attached at one end 27 to the brake shoe webs and at the other end to the hub 28 of the backing plate. These tension springs serve to return and retain the shoes in proper spaced relation with respect to the brake drum when the applied force is released.

Mounted on the webs of the brake shoes are two expanders 29. One end of these expanders are pivoted together on pivot pin 30 while the other ends 31 are suitably connected to the opposite ends of a usual operating mechanism of the cylinder 32 of a conventional hydraulic braking system. Each expander 29 is provided with a long slot 33 and a short slot 34. The long slots receive the upstanding lugs 18 of shoes 9 and 11 respectively, while the short slots 34 receive the lugs 18 of shoes 10 and 12 respectively. Secured to the sides of the expanders next adjacent the webs 15 are small spacing blocks 35 that keep the expanders suitably spaced from the webs of the brake shoes, and are located so as to be operatively engaged by the cam 24.

In operation, when the brake pedal is applied, the usual hydraulic mechanism will act upon the cylinder 32 and cause the pistons therein to move outwardly. These pistons will, in turn, act upon the ends 31 of the expanders 29 and move them outwardly. The expanders, in moving outwardly, will pivot upon the stationary pivot pin 30. At the same time the pressure of the expanders upon the studs 18 in slots 33 and 34 will cause the studs to be moved outwardly and carry with them the brake shoes 9, 10, 11 and 12. One expander will cause brake shoes 9 and 10 to move outwardly, while the other expander will move brake shoes 11 and 12 in a similar direction. The outward movement of the brake shoes is limited by the stops 21 thus preventing excessive wear on the brake lining and damage to the brake shoe and brake drum.

The cams 24 engage the spacing blocks 35 secured to the under sides of the expanders. Thus when adjusting shafts 25 are turned, the eccentrically mounted cams will be rotated to apply pressure to the blocks 35, and as rotation is increased, the blocks will be moved outwardly, carrying with them the expanders 29, and in turn, the brake shoes. This adjustment permits proper positioning of the brake shoes to account for wear on the brake lining.

With the exception of the portions 36, the brake lining will contact 360° of the drum face and there will be equal gripping or braking pressure at all points.

From the preceding description it will be manifest that this construction provides a simple and practical mechanism of a reliable and serviceable nature. Furthermore, the pressure of the brake shoes is evenly distributed over the entire brake drum surface in a true radial direction and the parts may be assembled or disassembled with ease.

I claim:

In an internal expanding brake mechanism, a non-rotatable backing plate, brake shoes mounted to slide radially upon said backing plate, each brake shoe having spaced slots, guide lugs on the backing plate and positioned within respective slots of the brake shoes, spring means connected between the backing plate and the brake shoes for returning the brake shoes in neutral or inoperative position, a pair of brake shoes, each shoe having a V-shaped notch, the notches being arranged in opposed relationship, spring tensioned fastener means for securing the brake shoes to the backing plate, studs carried by each shoe, expander plates having slots to receive the studs of the brake shoes for operating all of the brake shoes simultaneously, adjusting shafts, a cam fixed to each shaft and disposed between the opposed V-shaped notches of said brake shoes, a spacing block on said expander plates in the path of said cams and means for operating the expander plates.

RAYMOND B. WATT.

REFERENCES CITED

The following references are of record in the file of this patent:

UNITED STATES PATENTS

| Number | Name | Date |
| --- | --- | --- |
| 1,620,921 | Sanford | Mar. 15, 1927 |
| 1,707,272 | Livingston | Apr. 2, 1929 |
| 1,832,135 | Oliver | Nov. 17, 1931 |
| 1,853,201 | Buscher | Apr. 12, 1932 |
| 1,883,757 | Boone | Oct. 18, 1932 |
| 1,937,691 | Girling | Dec. 5, 1933 |
| 2,100,973 | Naylor | Nov. 30, 1937 |